Patented Oct. 21, 1952

2,614,918

UNITED STATES PATENT OFFICE 2,614,918

METHOD OF SETTING FRUIT AND COMPOSITION THEREFOR

Russell A. Kaberg, St. Louis, Mo., assignor to Monsanto Chemical Company, St. Louis, Mo., a corporation of Delaware No Drawing. Application October 25, 1945, Serial No. 624,573

13 Claims. (Cl. 71—2.5)

This invention relates to a novel method for setting fruit on fruit trees and to a novel composition therefor.

One of the objects of the present invention is the provision of a novel process for setting fruit on fruit trees by spraying the blossoms thereof with certain 8-quinolinols and 8-quinolinolates.

Another object is to provide a novel process for setting fruit on fruit trees by spraying the blossoms thereof during the blossoming period with a composition containing certain 8-quinolinols and 8-quinolinolates.

A further object is the provision of a novel fruit setting composition containing certain 8-quinolinols and 8-quinolinolates.

According to the present invention, generally stated, I have found that the proportion of fruit set from blossoms emerging from fruit trees, such as apple, peach, pear and plum trees, may be enhanced substantially by spraying the blossoms during the blossoming period with an 8-quinolinol selected from the group consisting of 8 - quinolinol, 5,7 - dibrom-8 - quinolinol, 5,7-dichlor-8-quinolinol and the metal salts thereof such as copper, zinc or cadmium salts of these 8-quinolinol compounds.

The 8-quinolinol compound may be applied to the blossoms in the form of a dust, either alone or admixed with an inert filler or carrier, such as pyrophyllite, talc, fuller's earth or bentonite clay. The 8-quinolinol compound may also be applied to the blossoms by spraying the blossoms with an aqueous suspension or emulsion of the compound. I have found that a concentration of 0.1 to 2 pounds, or preferably 0.25 to 1.25 pounds, of the 8-quinolinol compound per 100 gallons of water is effective for the purpose of enhancing the proportion of fruit set from blossoms on fruit trees. Moreover, there is no evidence of a need for variation in concentration of 8-quinolinol compound necessary for the setting of fruit on different types of fruit trees and it has been my experience that the above concentration ranges are effective in enhancing the proportion of fruit set regardless of the type of fruit or the variety in a given type of fruit. I have also found that the above concentration may be augmented without deleterious effect on the blossoms or the fruit. However, the concentration ranges described hereinabove are sufficient for the purpose and any amount used in excess of this is unnecessary. I have found it particularly satisfactory to disperse the 8-quinolinol compound in water. A small portion of wetting and dispersing agents, for example 0.05 to 0.5 pound per gallon of suspension, may be used.

In order for the fruit setting compound of the present invention to be effective in setting fruit, it is only necessary that the compound be present on the blossoms for a relatively limited period of time. For example, a period ranging from 24 to 48 hours may be sufficient to effectively enhance the proportion of fruit set from the blossoms emerging on the fruit tree. However, I have also found that the presence of the 8-quinolinol compound on the blossoms for a longer period of time does not give rise to any damage to the blossoms or to the resulting fruit. It may also be possible that the period of time contact of the 8-quinolinol compound with the blossom may be reduced to less than 24 hours with effective results. Inasmuch as little is known about the mechanism of the setting of fruit from the blossoms and the influence of chemicals thereon, it is difficult, if not impossible, to prescribe any minimum period of time of contact of the compound with the blossom.

The following examples will serve to illustrate the novel process of the present invention together with typical compositions suitable for this purpose. These examples are to be construed merely as illustrative of the invention and not as limiting the invention.

Example I

A 1% dust was prepared by thoroughly mixing 1 pound of copper-8-quinolinolate with 99 pounds of pyrophyllite. The resulting dust was sprayed on a series of apple trees during the blossoming period. A similar series of unsprayed trees was observed as a control. When the fruit was set a count was made and the results indicated a substantial increase in the proportion of fruit set from treated blossoms. In place of copper-8-quinolinolate in the above dust composition, other 8-quinolinol compounds such as 8-quinolinol, zinc-8-quinolinolate, 5,7-dibrom-8-quinolinolate, cadmium - 8 - quinolinolate, zinc - 5,7 - dichlor-8-quinolinolate and cadmium-5,7-dibrom-8-quinolinolate were employed in the same manner. Substantially identical results were obtained with these other compounds.

Example II

An aqueous suspension of copper-5,7-dibrom-8-quinolinolate was prepared by adding 1.25 pounds of copper-5,7-dibrom-8-quinolinolate to 100 gallons of water and agitating the mixture until a suspension resulted. During the agitation, 0.5 pound of sodium dodecylbenzene sulfonate was added to the mixture. The resulting suspension was sprayed on the blossoms present on six peach trees. After the fruit had set on the tree, a count was made of the peaches on the six trees and it was found that the proportion of fruit set on the sprayed trees was substantially enhanced in comparison with the fruit set on six adjacent unsprayed peach trees. Similar tests were made on pear, peach, apple and plum trees during various stages of the blossoming period thereof, using copper salts of 8-quinolinol, 5,7-dibrom-8-quinolinol and 5,7 - dichlor - 8 - quinolinol. A marked enhancement in the proportion of fruit set on the treated portion of each tree was observed.

I have also found that it is possible to embody the novel fruit setting compounds of the present invention in insecticidal and fungicidal spray compositions so that an overall treatment for fungus and insects may be applied to the tree along with the fruit setting treatment. For example, a spray composition may be prepared containing 3 pounds of lead arsenate, 4 pounds of lime and 1 pound of copper-8-quinolinol per 100 gallons of water and the resulting composition may be applied to the fruit trees during the blossoming period. In this manner, the fruit trees will be protected from the attack of fungus and insects and at the same time the blossoms will have present the novel fruit setting compound of the present invention for the purpose of enhancing the proportion of fruit which will set from the blossoms. It frequently happens that it becomes necessary to treat fruit trees to prevent attack by fungus prior to the time that the blossoms emerge on the tree. I have found, however, that it is necessary to apply the novel fruit setting compound of the present invention during the blossoming period and desirably at an early stage of the emergence of the blossom on the tree. I have found that once the fruit setting compound has been deposited on the blossom, it tends to remain on the blossom during the period of development of the blossom so that the novel fruit setting properties of the compound are available during this period. Since little is known about the exact time at which the novel fruit setting compounds of the present invention become effective, it is desirable to spray the blossoms at an early stage of the emergence of the blossoms.

The novel fruit setting compounds of the present invention may be applied in the form of an aqueous emulsion. However, the use of an emulsion form for the present purpose is not particularly desirable, inasmuch as some interference with the growth and development of the blossom may be experienced when some of the oily ingredients of a typical emulsion are applied to the blossom. This does not mean, however, that suitable emulsion formulations can not be produced by those skilled in the art and employed as a medium for the deposition of the novel fruit setting compounds of the present invention on the blossoms. Such emulsions are contemplated as embraced within the scope of the present invention.

While the process of the present invention has been illustrated in connection with apple, pear, peach and plum trees, the process is equally applicable to any other type of fruit tree and fruit bearing shrub in which blossoms emerge and subsequently set into fruit.

While the foregoing description and examples serve to define the present invention, it is to be understood that the present invention is not limited to any particular proportions, components or conditions, and that any such variations or modifications are to be considered as embodied in the present invention.

I claim:

1. A method of setting fruit on fruit trees comprising depositing on the blossoms of said trees during the blossoming period an 8-quinolinol compound selected from the group consisting of 8-quinolinol, 5,7-dibrom - 8 - quinolinol, 5,7-dichlor-8-quinolinol and copper, cadmium and zinc salts thereof, in a concentration and an amount sufficient to set fruit but insufficient to harm the trees.

2. A method of setting fruit on fruit trees comprising spraying blossoms of said trees during the blossoming period with an aqueous suspension of an 8-quinolinol compound selected from the group consisting of 8-quinolinol, 5,7-dibrom-8-quinolinol, 5,7-dichlor-8-quinolinol and copper, cadmium and zinc salts thereof, the concentration of the 8-quinolinol compound in the suspension and the amount of suspension which is applied being sufficient to set fruit but insufficient to harm the trees.

3. A method of setting fruit on fruit trees comprising applying to the blossoms of said trees during the blossoming period a dust composition comprising an 8-quinolinol compound selected from the group consisting of 8-quinolinol, 5,7-dibrom-8-quinolinol, 5,7-dichlor-8-quinolinol and copper, cadmium and zinc salts thereof, and a carrier, the concentration of the 8-quinolinol compound in the dust composition and the amount of the dust composition which is applied being sufficient to set fruit but insufficient to harm the trees.

4. A method of setting fruit on fruit trees comprising spraying the blossoms of said trees during the blossoming period with a composition comprising an aqueous emulsion of an 8-quinolinol compound selected from the group consisting of 8-quinolinol, 5,7-dibrom-8-quinolinol, 5,7-dichlor-8-quinolinol and copper, cadmium and zinc salts thereof, the concentration of the 8-quinolinol compound in the emulsion and the amount of emulsion which is applied being sufficient to set fruit but insufficient to harm the trees.

5. A method of setting fruit on fruit trees comprising depositing on the blossoms of said trees during the blossoming period a composition comprising an 8-quinolinol compound selected from the group consisting of 8-quinolinol, 5,7-dibrom-8-quinolinol, 5,7-dichlor-8-quinolinol and copper, cadmium and zinc salts thereof, and a carrier, the concentration of the 8-quinolinol compound in the composition and the amount of composition which is applied being sufficient to set fruit but insufficient to harm the trees.

6. A method of setting fruit on fruit trees comprising depositing on blossoms of said trees during the blossoming period a composition comprising an aqueous suspension of 8-quinolinol compound selected from the group consisting of 8-quinolinol, 5,7-dibrom - 8 - quinolinol, 5,7-dichlor-8-quinolinol, and copper, cadmium and zinc salts thereof, and a dispersing agent, the concentration of the 8-quinolinol compound in the suspension and the amount of suspension which is applied being sufficient to set fruit but insufficient to harm the trees.

7. A method of setting fruit on fruit trees comprising depositing on blossoms of said trees during the blossoming period a composition comprising an aqueous suspension of copper-8-quinolinolate, the concentration of copper-8-quinolinolate in the suspension and the amount of suspension being sufficient to set fruit but insufficient to harm trees.

8. A method of setting fruit on fruit trees comprising depositing on blossoms of said trees during the blossoming period a composition comprising an aqueous suspension of copper-5,7-dibrom-8-quinolinolate, the concentration of copper-5,7-dibrom-8-quinolinolate in the suspension and the amount of the suspension which is applied being sufficient to set fruit but insufficient to harm the trees.

9. A method of setting fruit on fruit trees comprising depositing on blossoms of said trees during the blossoming period a composition comprising an aqueous suspension of copper-5,7-dichlor-8-quinolinolate, the concentration of copper-5,7-dichlor-8-quinolinolate in the suspension and the amount of suspension which is applied being sufficient to set fruit but insufficient to harm the trees.

10. A composition for use in setting fruit on fruit trees during the blossoming period comprising an aqueous suspension of an 8-quinolinolate compound selected from the group consisting of 8-quinolinol, 5,7-dibrom-8-quinolinol, 5,7-dichlor-8-quinolinol and copper, cadmium and zinc salts thereof, the 8-quinolinolate compound being suspended in the aqueous medium by means of a small amount of a dispersing agent.

11. A composition for use in setting fruit on fruit trees during the blossoming period comprising an aqueous suspension of copper-8-quinolinolate, the copper-8-quinolinolate being suspended in the aqueous medium by means of a small amount of a dispersing agent.

12. A composition for use in setting fruit on fruit trees during the blossoming period comprising an aqueous suspension of copper-5,7-dibrom-8-quinolinolate, the copper-5,7-dibrom-8-quinolinolate being suspended in the aqueous medium by means of a small amount of a dispersing agent.

13. A composition for setting fruit on fruit trees during the blossoming period comprising an aqueous suspension of copper-5,7-dichlor-8-quinolinolate, the copper-5,7-dichlor-8-quinolinolate being suspended in the aqueous medium by means of a small amount of a dispersing agent.

RUSSELL A. KABERG.

REFERENCES CITED

The following references are of record in the file of this patent:

UNITED STATES PATENTS

| Number | Name | Date |
| --- | --- | --- |
| 2,248,400 | Avery | July 8, 1941 |
| 2,284,022 | Lontz | May 26, 1942 |
| 2,314,091 | Jones | Mar. 16, 1943 |
| 2,341,867 | Hitchcock | Feb. 15, 1944 |
| 2,381,863 | Benignus | Aug. 14, 1945 |
| 2,387,591 | Kolb | Oct. 23, 1945 |
| 2,476,235 | Benignus | July 12, 1949 |

FOREIGN PATENTS

| Number | Country | Date |
| --- | --- | --- |
| 139,130 | Austria | Oct. 25, 1934 |
| 572,126 | Germany | Mar. 14, 1933 |
| 475,569 | Great Britain | Dec. 23, 1937 |